United States Patent [19]
Ogasawara

[11] Patent Number: 4,496,229
[45] Date of Patent: Jan. 29, 1985

[54] APPARATUS FOR TRANSMITTING INFORMATION SIGNALS IN A CAMERA

[75] Inventor: Akira Ogasawara, Kanagawa, Japan
[73] Assignee: Nippon Kogaku K. K., Japan

[21] Appl. No.: 517,283
[22] Filed: Jul. 26, 1983

[30] Foreign Application Priority Data

Jul. 26, 1982 [JP] Japan ................................ 57-129939

[51] Int. Cl.³ .......................... G03B 3/10; G03B 13/02
[52] U.S. Cl. ..................................... 354/400; 354/286
[58] Field of Search ..................... 354/400, 402, 195.1, 354/286

[56] References Cited

U.S. PATENT DOCUMENTS 4,323,303 4/1982 Enomoto ............................ 354/402
4,348,089 9/1982 Shenk ................................ 354/400
4,359,276 11/1982 Tomori .............................. 354/400
4,360,258 11/1982 Hashimoto .......................... 354/400
4,400,075 8/1983 Tomori et al. ...................... 354/286
4,404,595 9/1983 Ushiro et al. ....................... 354/402
4,413,893 11/1983 Tomori .............................. 354/286
4,416,526 11/1983 Tomori et al. ...................... 354/286
4,443,085 4/1984 Tomori et al. ...................... 354/286

*Primary Examiner*—Russell E. Adams
*Attorney, Agent, or Firm*—Gerald J. Ferguson, Jr.; Joseph J. Baker

[57] ABSTRACT

An auto-focusing camera having an imaging optical system with a focusing lens movable along the optical axis and means for driving the focusing lens said camera comprises:

(a) a taking lens unit with the imaging optical system including terminal means having a first electrical contact, first transmission means which, in response to the movement of the focusing lens, feeds the first electrical contact with a voltage having a substantially constant and periodically repeating peak value, and second transmission means which is energized to feed said first electrical contact with a voltage associated with the focal length of the imaging optical system; and (b) a camera body including means for generating an information signal indicating the deviation from a predetermined focal plane of the image of the object that is formed by the imaging optical system, terminal means inclusive of a second electrical contact coupled said first electrical contact and which is coupled to the terminal means in said taking lens unit, response means connected to the second electrical contact which, in response to the first transmission means, feeds an output signal for energizing the second transmission means between peaks of the periodic voltage, and control means preparing a signal for controlling the drive means from the voltage generated at the second electrical contact and the information signal.

13 Claims, 8 Drawing Figures

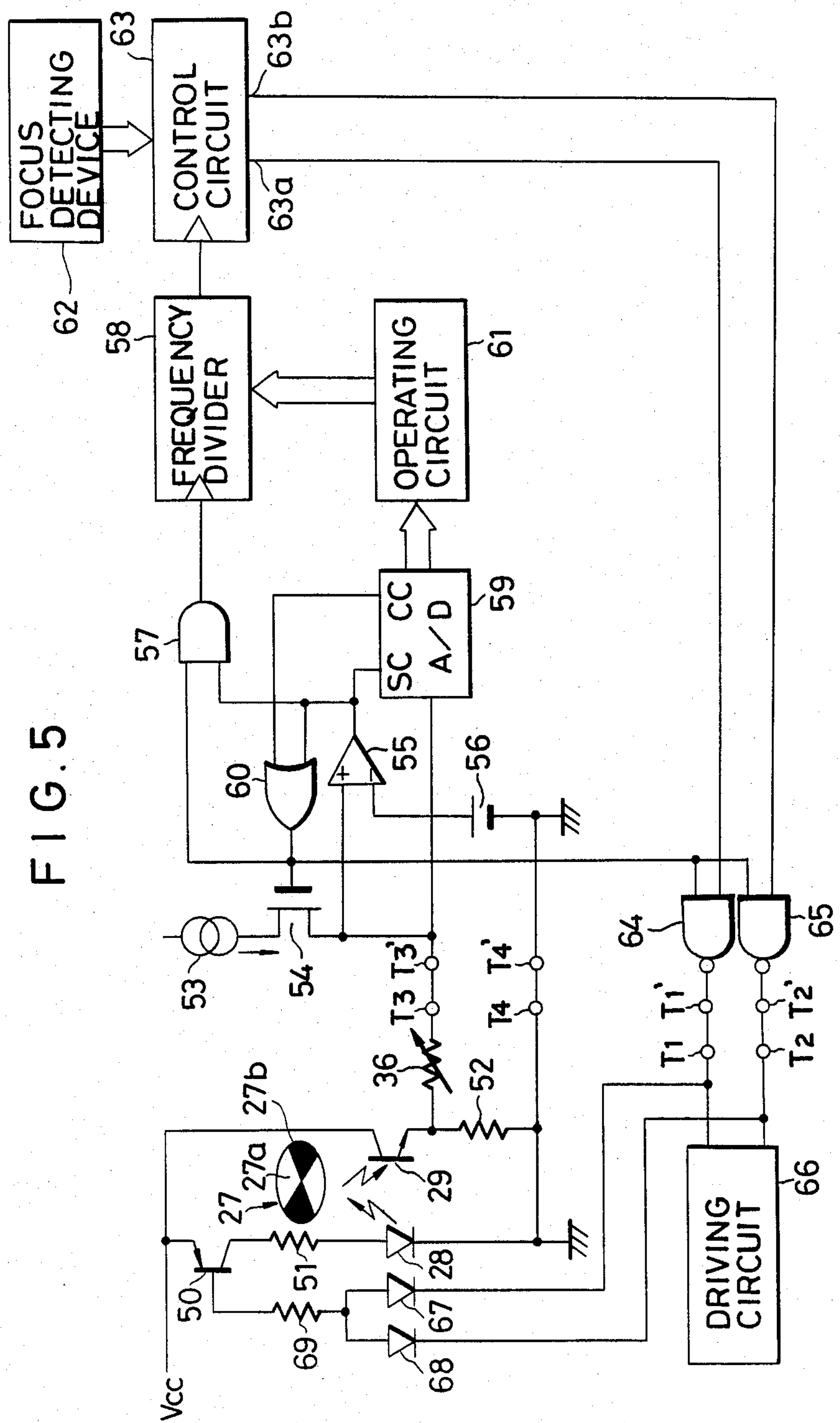
F I G. 5
FOCUS DETECTING DEVICE
CONTROL CIRCUIT
FREQUENCY DIVIDER
OPERATING CIRCUIT
SC CC
A/D
DRIVING CIRCUIT
Vcc
T1 T1'
T2 T2'
T3 T3'
T4 T4'
62
63
63a
63b
58
61
57
59
60
55
56
53
54
36
52
27
27a
27b
29
28
50
51
67
68
69
64
65
66

FOCUS DETECTING DEVICE
CONTROL CIRCUIT
FREQUENCY DIVIDER
OPERATING CIRCUIT
SC CC A/D
FREQUENCY DIVIDER
DRIVING CIRCUIT
62
63
63a
63b
58
161
59
70
57
60
55
56
53
54
I
T3' T3
T4' T4
T1' T1
T2' T2
64
65
66
36
52
29
27
28
50
51
67
69
68
Vcc

APPARATUS FOR TRANSMITTING INFORMATION SIGNALS IN A CAMERA

BACKGROUND OF THE INVENTION

1. Field of the Invention

The present invention relates to an apparatus for transmitting information signals between a camera and its accessories such as a taking lens. More particularly, the invention relates to an apparatus useful in transmitting lens displacement information from a taking lens unit to the body of a camera equipped with a focus detecting mechanism.

2. Description of the Prior Art

In single-lens reflex cameras with an auto-focusing mechanism, the about of light passing through a taking lens is determined by a TTL focus detecting device which, on the basis of the determined amount of light, detects the deviation between the predetermined focal plane of the taking lens, for example, the film surface, and the plane in which the actual image of the object is formed. Typical examples of this TTL focus detecting device are shown in U.S. Pat. Nos. 4,185,191 and 4,264,810. The taking lens can be brought into focus by driving the focusing lens in the taking lens system by the amount corresponding to the detected deviation of image plane. If the taking lens has a fixed focal length, the distance the focusing lens must be moved has a substantially constant relation with the detected deviation of image plane. Therefore, precise focusing can be achieved by simply collating the required displacement of the focusing lens against the detected image plane deviation. But with a taking lens such as a zoom lens having a variable focal length, the relation between the distance the focusing lens must be moved and the detected deviation of image plane also varies with a variation in the focal length. Therefore, precise or rapid auto-focusing is difficult to achieve with a taking lens having a variable focal length.

To ensure precise or rapid auto-focusing in a single-lens reflex camera, a plurality of information signals must precisely be transmitted between the camera body and the interchangeable taking lens unit. In addition, modern cameras require that various pieces of information such as aperture value, object distance and minimum aperture value be transmitted from the lens unit to the camera body as electrical signals. For this purpose, a number of terminals are necessary, but it is difficult for the lens unit to provide for a space large enough to accommodate these terminals. Furthermore, the chance of failures such as poor contact will increase as more terminals are used. We already filed U.S. Ser. No. 441,787 on Nov. 15, 1982 and proposed a technique for eliminating these problems, but a further improvement is desires.

SUMMARY OF THE INVENTION

Therefore, one object of the present invention is to provide an auto-focusing apparatus that can be used with a taking lens such as a zoom lens having a variable focal length and which is capable of precise and rapid focusing irrespective of variations in the focal length.

Another object of the present invention is to provide an auto-focusing taking lens uhit having a variable focal length that is capable of outputting a signal for the distance the image plane must be moved and a signal for correcting said signal depending upon the specific focal length.

A further object of the present invention is to provide an auto-focusing lens unit that requires a minimum number of terminals by outputting at the same terminal an electrical signal associated with the distance the focusing lens must be moved and other information signals from the lens.

Still another object of the present invention is to provide a signal sending apparatus that outputs at the same terminal a pulse signal of a subtantially constant amplitude that indicates the distance the image plane is moved and another signal that represents an analog value for correcting said pulse signal.

BRIEF DESCRIPTION OF THE DRAWINGS

FIG. 5 is a circuit diagram showing a first embodiment of the present invention;

DESCRIPTION OF PREFERRED EMBODIMENTS

Figure 1:
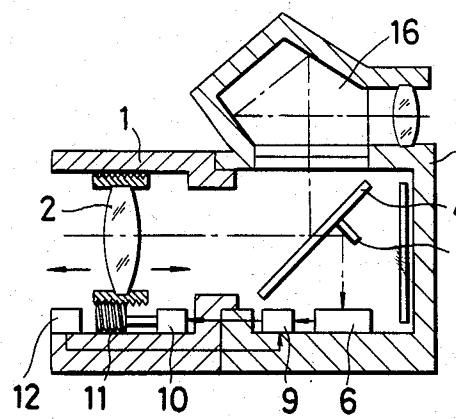
FIG. 1 is a cross section of an auto-focusing camera.
Figure 2:
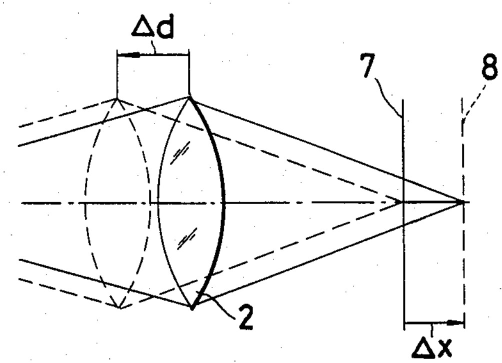
FIG. 2 is an optical path showing the relation between the distance a taking lens is moved and the resulting image plane.

A single-lens reflex camera that detects the deviation of image plane and causes the focusing lens to move a distance corresponding to that deviation is shown in FIG. 1. A beam of light coming from the object and passing through a taking lens 2 in an interchangeable lens unit 1 passes through a quick-return mirror 4 in the camera body 3 and is reflected from a sub-mirror 5 at the back of the mirror 4 and enters a focus detecting device 6 on the bottom of the camera body. As shown in FIG. 2, the focus 5 detecting device 6 detects a deviation of image plane $\pm\Delta x$ between a predetermined focal plane 7, say, the film surface, of the taking lens 2 and the actual plane 8 on which the image of the object is formed. The plus sign indicates that the plane 8 is ahead of the focal plane 7, and the minus sign means that the plane 8 is behind the focal plane 7. The absolute value represents the magnitude of the deviation.

The focus detecting device 6 delivers an output to a control circuit 9 which accordingly supplies a drive signal for causing a motor 10 in the lens unit 1 to run in either direction or bringing the same to a sudden stop. In response to this drive signal, the motor 10 drives the taking lens 2 toward an in-focus position through a transmission system 11. On the basis of the rpm of the motor, the amount the transmission system moves or the distance the taking lens moves, means 12 prepares a signal indicative of the distance the image plane 8 moves as a result of the displacement of the taking lens. This signal is transmitted from the lens unit 1 to the camera body 3 and is entered into the control circuit 9. The control circuit brings the motor to a sudden stop when the signal indicative of the displacement of the image plane has reached a value corresponding to the magnitude of the focus detecting signal ($\Delta x$). In this way, the taking lens 2 is driven until the image plane 8 is moved a distance equal to the deviation of image plane ($\Delta x$) detected by the focus detecting device 6.

Figure 3:
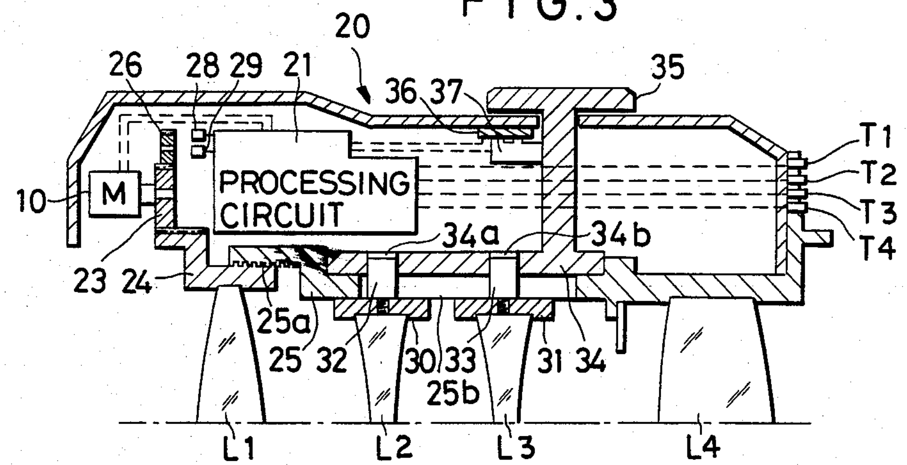
FIG. 3 is a cross section of a zoom lens mount according to an embodiment of the present invention.
Figure 4:
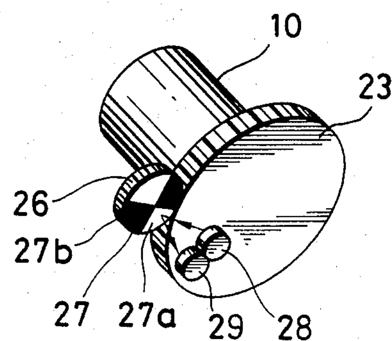
FIG. 4 is a partial enlarged perspective view of FIG. 3.

An embodiment of the zoom lens unit according to the present invention is shown in FIG. 3. An interchangeable zoom lens unit generally indicated at 20 includes a focusing lens $L_1$, a variator lens $L_2$, a compensator lens $L_3$ and a master lens $L_4$. The rear end of the lens unit onto which the camera body is installed is equipped with signal terminals $T_1$ to $T_3$ for transmitting signals to and from the camera body and a grounding terminal $T_4$. The motor drive signal from the camera body indicating the running of the motor in forward or reserve direction or its sudden stop is fed through terminals $T_1$ and $T_2$ to a processing circuit 21 in the lens unit 20. The processing circuit includes a motor driving circuit and a signal sending circuit. The motor 10 is caused to run in either forward or reverse direction or brought to a sudden stop by the output from the processing circuit 21 in response to the motor drive signal from the camera body. A gear 23 transmits the rotary motion of the motor 10 to a lens barrel 24 holding the focusing lens $L_1$. The lens barrel 24 is equipped with a gear wheel intermeshing with the wheel 23 and a helicoidal screw that engages a helicoidal thread 25*a* cut on a fixed tube 25. Therefore, as the motor is run in forward or reverse direction, the lens barrel causes the focusing lens $L_1$ to move forward or backward along the optical axis. The gear wheel 23 also intermeshes with a small gear wheel 26 one side of which is provided with a rotating disk 27 as shown in FIG. 4. The surface of this disk is divided into four quadrants, two high reflectance sectors 27*a* and two low reflectance sectors 27*b*. A light source 28 projects a light onto one of these sectors from which it is reflected toward a light-receiving element 29. The element 29 generates two pulses per revolution of the pattern 27 as a result of the rotation of the gear wheel 26. These pulses are sent throught the processing unit 21 to terminal $T_3$ as a signal which represents the distance the focusing lens moves by the number of the pulses it contains.

Let us know describe the relation between the movement of the focusing lens $L_1$ and the resulting displacement of the plane on which the actual image of the object is formed. Referring to FIG. 2, if the focusing lens 2 is in the position indicated by the solid line, the taking lens (as represented by the focusing lens) forms the image of the object on plane 8, which is deviated from a predetermined focal plane 7, say the surface of the film, by $\Delta x$. If the focusing lens 2 is moved by a distance $\Delta d$ along the optical axis, the plane 8 is displaced by $\Delta x$ and brought into registry with the predetermined focal plane 7.

The relation between the distance $\Delta d$ the focusing lens is moved and the resulting displacement $\Delta x$ of the image plane generally depends on the optical characteristics such as the focal length of the taking lens. In addition, the relation between the rpm of the motor 10 and the distance the focusing lens 2 is moved depends on the characteristics of the transmission system betweeen the motor and the focusing lens. Consequently, the relation between the rpm of the motor and the resulting displacement of the image plane depends on the specific type of the taking lens. In the conventional art, the number of sectors into which the rotating disk 27 is divided is varied according to the type of the taking lens, so that the same number of pulses will be generated for the same amount of displacement $\Delta x$ of the image plane irrespective of the type of the taking lens.

However, in the case of a zoom lens system, the relation between the distance $\Delta d$ the focusing lens moves and the resulting displacement $\Delta x$ of the image plane is not determined uniquely and varies with the particular focal length of the zoom lens. Stated more specifically, if the focal length increases from $f_1$ to $f_2$ ($f_2 > f_1$), the displacement of the image plane is increased in proportion to the square of the ratio of $f_2$ to $f_1$. This means that if the zoom lens is set to a large focal length, the displacement of the image plane resulting from the movement of the focusing lens by a given distance is much greater than when the zoom lens is set to a small focal length.

The surface of the rotating disk 27 is divided into a a fixed number of sectors independently of the actual focal length of the zoom lens, and this number is so determined that the number of pulses contained in a pulse signal coming from the light-receiving element 29 indicates the displacement of the image plane for the case where the zoom lens is set to a certain focal length, typically the greatest focal length $f_0$. Therefore, if the zoom lens is set to other focal lengths, the number of pulses in the pulse signal coming the light-receiving element 29 is no longer a correct indication of the required displacement of the image plane. To avoid this problem, the present invention prepares a signal that corrects the number of pulses according to the specific focal length of the zoom lens so that said number will indicate correctly the displacement of the image plane for any focal length.

Referring again to FIG. 3, the lens barrel 30 (31) of the variator lens $L_2$ ($L_3$) has a pin 32 (33), which fits into a cam groove 34*a* (34*b*) in a zoom tube 34 through a guide groove 25*b* made in a fixed tube 25. The zoom tube 34 forms an integral part of a manually operated zooming ring 35. A variable resistor 36 and a brush 37 that slides on it to changes its resistivity form a device for introducing the relative focal length. The resistor 36 is connected to the processing circuit 31 and the brush 37 is fixed to the zooming ring 35. The ratio of the greatest focal length $f_0$ to the focal length f that is determined by the amount of rotation of the ring 35 is introduced into the processing circuit 21.

We now describe by referring to FIG. 5 the two portions of the processing circuit 21, i.e. signal sending circuit and the circuit leading to the camera body. In FIG. 5, the light source 28 in FIG. 3 is shown as a light-emitting diode which is supplied with power through a switching transistor 50 and a current limiting resistor 51. The light-receiving element 29 shown as a photoresistor functions as a switching device, with its collector connected to the battery's positive line Vcc and the emitter to the grounding line through a load resistor 52. The variable resistor 36 in FIG. 3 is connected between the junction of the emitter and a lens side terminal $T_3$. The resistivity of the variable resistor 36 need not be continuously variable with the change in the relative focal length, and instead, the focal lengths within each section of the range of the variation of the relative focal length may be represented by a single value of resistivity. In the latter case, the variable resistor 36 may be composed of a plurality of resistors each having a representative value of resistivity as defined above, and one of them is selected depending upon the specific value of the relative focal length. Lens side terminals $T_3$ and $T_4$ are respectively connected to terminals $T_3'$ and $T_4'$ on the camera body side. A constant-current source 53 supplies a constant current I to a series connection of the variable resistor 36 and load resistor 52 through a switching transistor 54 and terminals $T_3'$ and $T_4'$. The constant-current source 53 and transistor 54 make up a power supplying means. This power supplying means may be provided on the lens unit side. The phototransistor 29, load resistor 52, variable resistor 36 and power supplying means 53, 54 make up a signal sending device. A waveshaping comparator 55 shapes the pulse signal from terminal $T_3'$ into a rectangular wave on the basis of the reference voltage from a capacitor 56. The waveshaped pulse signal is fed into a frequency divider 58 through an AND gate 57. An A/D converter 59 performs A/D conversion on the relative focal length information from the variable resistor 36. In response to the falling edge of the output of comparator 55 that is fed to an inputer terminal SC (Start Conversion), the converter 59 inverts the output from an output terminal CC (Conversion Complete) to the low (L) level, and at the same time, the converter starts A/D conversion of the signal appearing at terminal $T_3'$, and upon completion of this conversion, the terminal CC delivers a high (H) level signal. If the signal to be A/D converted appears at terminal $T_3'$ such a long time after the appearance of the falling edge of the output from comparator 55 that the time lag between the two phenomena is not negligible, the A/D converter 59 must include a delay circuit that extends the duration between the receiving of the falling edge and the commencement of A/D conversion beyond the time lag. An OR gate 60 is fed with the output from terminal CC and the output from the comparator 55. An "L" level output from the OR gate 60 turns on the transistor 54. An operational circuit 61 receives the relative focal length information that has been digitized in the A/D converter 59 and after performing the necessary operation on that information, the circuit delivers an output that determines the dividing ratio for the frequency divider 58. Stated specifically, the circuit 61 calculates the frequnecy dividing ratio from the relative focal length information in such a manner that the number of pulses in the output pulse signal corresponds to the displacement of image plane $\Delta x$ due to the movement of the focusing lens. More specifically, the circuit calculates the square of the ratio of $f_0$ to f and delivers $(f_0/f)^2$ as a dividing ratio signal. A focus detecting device 62 measures the amount of light passing through the optical system of the lens unit of FIG. 3, detects the amount of deviation of image plane $\Delta x$ (FIG. 2) and the direction of deviation of the actual image forming plane 8 from the predetermined focal plane 7, and outputs signals indicative of these two parameters. A control circuit 63 receives the output from the focus detecting device 62 and delivers "H" and "L" level signals in response to the signal indicating the direction of the deviation. If the signal shows that the actual image plane 8 is behind the predetermined focal plane 7 as in FIG. 2, the control circuit provides output terminals 63*a* and 63*b* with "H" and "L" level signals, respectively, for driving the motor in forward direction. If the image plane 8 is ahead of the focal plane 7, "L" and "H" level signals are respectively supplied to the terminals 63*a* and 63*b* for leaving the motor in reverse direction. The control circuit 63 includes a counter for counting the number of pulses contained in the pulsive signal from the frequency divider 58, a comparator circuit that compares the count of pulses with the signal indicating the deviation of plane image $\Delta x$ and which with delivers an output when the predetermined relation between the two factors has been obtained, and a circuit which, in response to the output from the comparator circuit, supplies each of the output terminals 63*a* and 63*b* with a "H" level signal for bringing the motor to a sudden stop.

A NAND gate 64 (65) receives at its inputs the output from terminal 63*a* (63*b*) and the output from OR gate 60, and its output is fed to a motor drive circuit 66 through terminals $T_1'$ ($T_2'$) and $T_1$ ($T_2$). At the same time, the output of NAND gate 64 (65) controls the switching transistor 50 through a diode 67 (68) and a resistor 69. The motor drive circuit 66 causes the motor 10 in FIG. 3 to run in forward direction when terminals $T_1$ and $T_2$ receives "L" and "H" level signals, respectively, and in reverse direction if the respective terminals receive "H" and "L" level signals. If both terminals receive an "L" level signal, the motor is brought to a sudden stop, and if both terminals receive an "H" level signal, the drive circuit cuts off the power supply to the motor.

The sequence of auto-focusing by the apparatus of the present invention is hereunder described.

Figure 6:
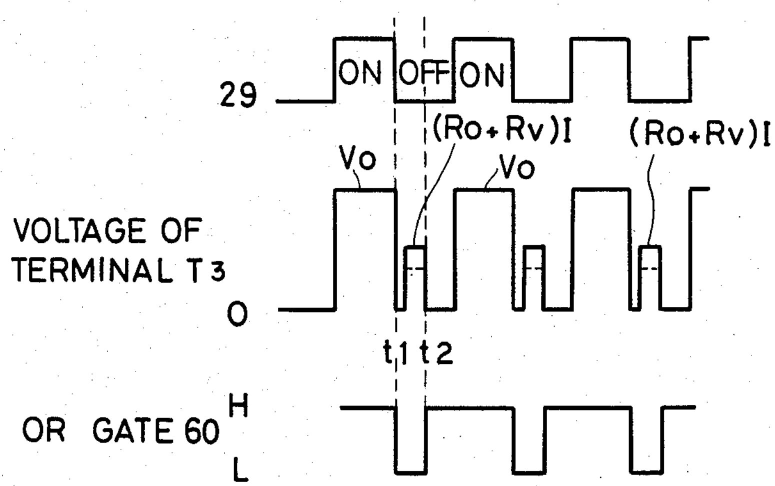
FIG. 6 is a chart showing the waveform produced in the circuit of FIG. 5.

If the focal length of the zoom lens is set to a certain value f by turning the ring 35 in FIG. 3, a corresponding value, namely, the ratio of the greatest focal length $f_0$ to f ($f_0/f$) is established in the variable resistor 36 as its resistivity. Then, the focus detecting device 62 starts to operate and feeds the control circuit 63 with the signal indicating the deviation of image plane $\Delta x$ and the signal indicative of the direction of that deviation. In response to the signal for the direction of the deviation, the control circuit 63 produces an "H" level potential at one of the two output terminals 63*a* and 63*b* and an "L" level potential at the other. In this case, the terminal CC of the A/D converter 59 has an "H" level potential, and since this "H" level is fed to both NAND gates 64 and 65 through the OR gate 60, one of the NAND gates delivers an "H" level signal and the other produces an "L" level signal depending upon the output from the control circuit 63. Then, the motor drive circuit 66 drives the motor 10 in either forward or reverse direction so as to move the focusing lens along the optical axis and rotate the disk 27. The "L" level output from one of the NAND gates turns on the switching transistor 50. Then, the light-emitting diode 28 is switched on and illuminates a small region of the disk 27. The phototransistor 29 is turned on when it receives light reflected from the high reflectance sector 27*a* of the disk 27 and it is turned off upon receiving light reflected from the low reflectance sector 27*b*. Therefore, as shown in FIG. 6, the phototransistor 29 is turned on and off periodically as the motor 10 keeps running. When the transistor 29 is on, the terminal $T_3$ has a constant potential Vo that is determined by the load resistor 52, and when it is off, the potential is grounded and zero. The turning on and off of the phototransistor need not be effected in such a strict manner that power supply to the load resistor 52 is permitted when the transistor is on but is completely cut when it is off; the only requirement is that the transistor produces a great difference in voltage across the load resistor 52 between the ON and OFF states. The pulsive signal appearing at terminal $T_3$ is shaped into a rectangular wave by the comparator 55. It should be noted that the actual pulse signal at terminal $T_3$ does not have a rectangular wave of the type shown in FIG. 6, which is obtained only after the waveshaping operation in the comparator 55. In response to the falling edge of the pulse at time $t_1$, the A/D converter 59 inverts the potential at terminal CC from "H" to "L" level.

The resulting "L" level causes the OR gate 60 to produce an "L" level output which turns on the transistor 54. Then the constant-current source 53 supplies a constant current I to the series connection of resistors 36 and 52. Therefore, as shown in FIG. 6, a voltage (Ro+Rv)·I as relative focal length information appears at terminal $T_3$ soon after the appearance of the falling edge. The Ro is the resistivity of the load resistor 52 and Rv is the resistivity of the variable resistor 36. The voltage for the relative focal length information is read into the A/D converter 59 and is subjected to A/D conversion. When the A/D conversion is completed at time $t_2$, the potential at terminal CC changes to the "H" level, which turns off the transistor 54 through OR gate 60 and blocks the supply of constant current I. As a result, the potential at terminal $T_3$ is grounded. The operational circuit 61 performs the necessary operation on the digitized relative focal length information so as to prepare an output for determining the frequency dividing ratio.

The foregoing description assumes that the leakage current from the transistor 29 that occurs in the reading of the voltage for the relative focal length information due to stray light or light reflected from the low reflectance sector **27*b* is negligibly small. If this leakage current is so large that it is no longer negligible, it affects the voltage for the relative focal length information and reduces the accuracy of its reading. In order to avoid this problem, the "L" level output that is delivered from the OR gate 60 in response to the falling edge of pulse Vo not only turns off the transistor 54 but also causes both NAND gates 64 and 65 to produce an "H" level output that turns off the transistor 50. Then, the light-emitting diode 28 is turned off and ensures the turning off of the phototransistor 29. The "H" level output from the NAND gates 64 and 65 cuts off the power supply to the motor but the motor continues to run by inertia. The light-emitting diode 28 stays off throughout the period of A/D conversion, or as long as the OR gate 65 keeps supplying an "L" level output. This duration is so selected that it is shorter than the period during which the phototransistor 29 stays off. Therefore, the turning off of the light-emitting diode 28** will cause no adverse effect on the generation of voltage Vo.

If the pulse signal Vo falls at time $t_1$, and the OR gate 60 produces an "L" level output, the AND gate 57 is closed. Therefore, throughout the production of the voltage (Ro+Rv)·I for relative focal length information, the AND gate 57 blocks the supply of the output of comparator 55 into the frequency divider 58. Needless to say, if the magnitude of the information voltage (Ro+Rv)·I can be set at a value smaller than the voltage from the reference voltage source 56 throughout the operating range of the variable resistor 36, the AND gate 57 is not necessary because said information voltage disappears after it passes through the comparator 55. As a result, the frequency divider 58 performs frequency division on only the voltage pulse Vo (which develops when the phototransistor 29 is on) by the ratio that is determined by the output from the operational circuit 61.

The pulse signal that has been corrected in the frequency divider 58 according to the displacement of image plane Δx is then sent to the control circuit 63. The control circuit counts the number of pulses in the signal and compares the obtained count with the image plane deviation signal Δx from the focus detecting device 62. If the predetermined relation of the two factors is established, for example, if they coincide with each other, the control circuit supplies both output terminals **63*a* and 63*b* with an "H" level potential as a motor stop signal. The "H" level potential causes both NAND gates 64 and 65 to produce an "L" level output which brings the motor into a sudden stop. After completing the autofocusing operation by the sequence described above, the zooming ring 35 may be turned again to set the focal length at another value. As a result, the resistivity Rv of the variable resistor 36 varies and the relative focal length information voltage (Ro+Rv)·I changes as indicated by the dashed lines in FIG. 6**, but no change occurs to the pulse signal Vo.

As will be apparent from the foregoing description, as long as the phototransistor 29 stays off, the signal sending apparatus generates information voltage that is determined by the variable resistor 36 and load resistor 52, and while the transistor 29 is on, said apparatus generates pulses having a constant amplitude Vo irrespective of the resistivity of the variable resistor 36. Because of their constant amplitude, the pulses can be easily processed by the waveshaping circuit 55 and the latter can adopt a simple circuit configuration.

Figure 7:
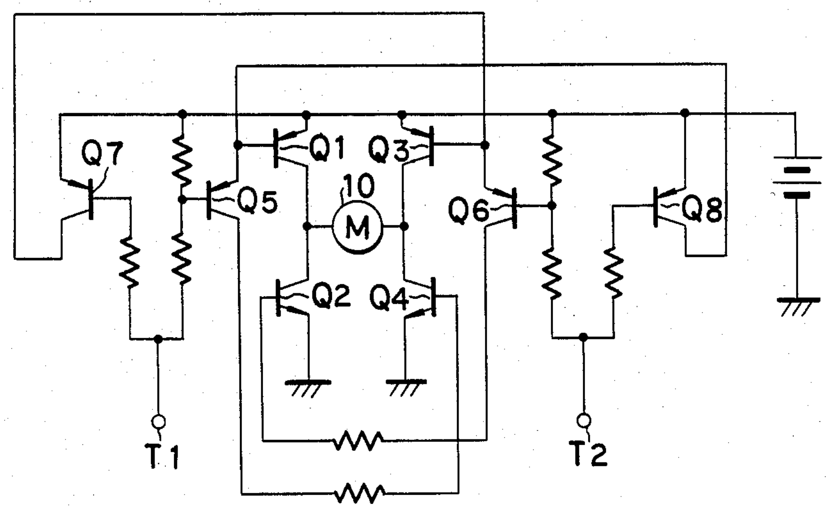
FIG. 7 is a circuit diagram showing a specific configuration of the motor drive circuit in FIG. 5.

A specific embodiment of the motor drive circuit 66 is shown in FIG. 7. When both terminals $T_1$ and $T_2$ have an "H" level potential, all transistors $Q_1$ to $Q_8$ are off and no power is supplied to the motor 10. When terminal $T_1$ has an "L" level potential and terminal $T_2$ attains an "H" level potential, transistors $Q_1$, $Q_4$, $Q_5$ and $Q_7$ are turned on and the other transistors $Q_2$, $Q_3$, $Q_6$ and $Q_8$ remain off, so the motor starts to run in one direction. When terminal $T_1$ receives an "H" level potential and terminal $T_2$ receives an "L" level potential, transistors $Q_1$, $Q_4$, $Q_5$ and $Q_7$ are turned off and the other transistors $Q_2$, $Q_3$, $Q_6$ and $Q_8$ are turned on, and the motor runs in reverse direction. If both terminals $T_1$ and $T_2$ receive an "L" level potential, transistors $Q_2$ and $Q_4$ to $Q_8$ are turned on so as to bring the motor 10 to a sudden stop.

Figure 8:
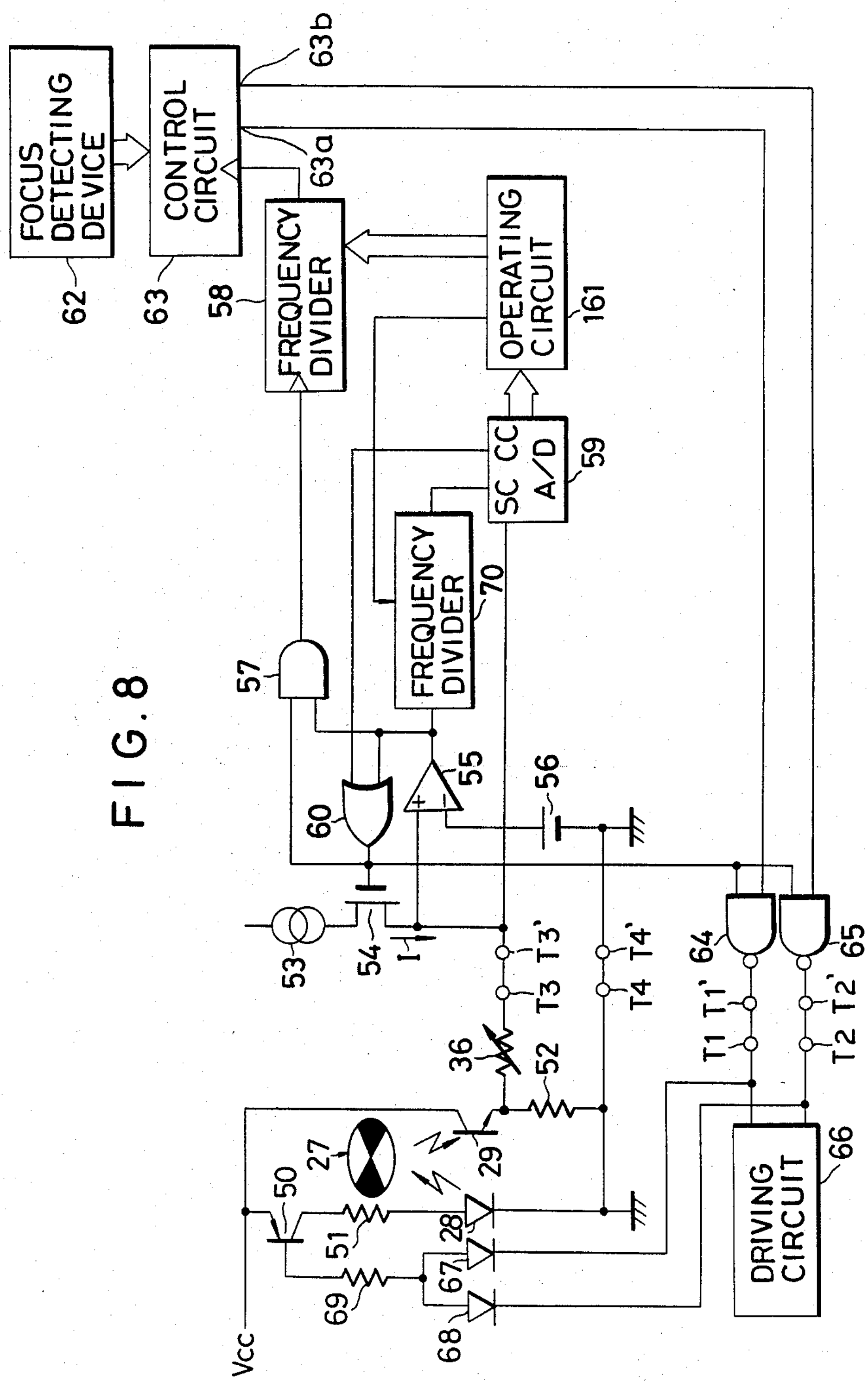
FIG. 8 is a circuit diagram for a second embodiment of the present invention.

In the first embodiment of the present invention described in the foregoing pages, the voltage for the relative focal length information is read into the A/D converter for every period of the pulse signal that appears at terminal $T_3$. The interval between each reading of this information voltage may be changed according to the specific focal length and this is the second embodiment of the present invention which is shown in FIG. 8, wherein the same component as in the first embodiment are identified by like numerals. A second frequency divider 70 performs frequency division on the pulse signal from the comparator 55 and sends the divided pulse signal to input terminal SC of the A/D converter 59. An operational circuit 161 produces not only the first output that determines the dividing ratio for the first frequency divider 58 but also the second output that determines the dividing ratio for the second frequency divider 70. As in the first embodiment, these outputs are determined on the basis of the relative focal length information. The second output is so determined that the dividing ratio of the second frequency divider 70 is decreased as the focal length is set at a larger value. This is because the displacement of image plane Δx per pulse or unit distance the focusing lens moves is increased as the focal length is increased. Therefore, by establishing the relation between the focal distance and the dividing ratio for each frequency divider as specified above, the relative focal length information can be read into the A/D converter for almost the same amount of displacement of image plane irrespective of the focal length. In the operational circuit 161, the relative focal length information need not be in exact coincidence with the first or second output, and instead, a predetermined value of the first or second output may be allocated to relative focal length information within a given range.

The second embodiment has the following advantage over the first embodiment. In the first embodiment, the relative focal length information is read into the A/D converter for each period of the pulse signal, and throughout this period, no power is supplied to the motor, so the speed at which the focusing lens is moved is reduced to make rapid focusing difficult. On the other hand, in the second embodiment, the relative focal length information is read into the A/D converter for every two or more periods that are determined by the specific focal length, so the number of power cutoffs is decreased and rapid focusing is ensured. In the second embodiment, it is desirable to achieve more precise reading of the relative focal length information by determining the relation between the resistivity Rr of the variable resistor 36 and the focal length ratio fo/f in such a manner that Rr becomes greater than Ro, the resistivity of the load resistor 52, when said focal length ratio is increased by "1".

In both the first and second embodiments, a photoelectric device such as a phototransistor is used as a switching device, but it should be understood that any switching device that is capable of periodic control over the power supply to the load resistor in response to the actuation of drive means such as a motor may be used, and suitable examples of such switching device are a magnetic load switch and a Hall device.

What is claimed is:

1. An auto-focusing camera having an imaging optical system with a focusing lens movable along the optical axis and means for driving said focusing lens said camera comprising:

(a) a taking lens unit with said imaging optical system including terminal means having a first electrical contact, first transmission means which, in response to the movement of said focusing lens, feeds said first electrical contact with a voltage having a substantially constant and periodically repeating peak value, and second transmission means which is energized to feed said first electrical contact with a voltage associated with the focal length of said imaging optical system; and (b) a camera body including means for generating an information signal indicating the deviation from a predetermined focal plane of the image of the object that is formed by said imaging optical system, terminal means inclusive of a second electrical contact coupled to said first electrical contact and which is coupled to the terminal means in said taking lens unit, response means connected to said second electrical contact which, in response to said first transmission means, feeds an output signal for energizing said second transmission means between peaks of said periodic voltage, and control means preparing a signal for controlling said drive means from the voltage generated at said second electrical contact and said information signal.

2. An auto-focusing camera according to claim 1 wherein said first transmission means includes constant-voltage generating means driven intermittently responsive to the movement of said focusing lens, and said second transmission means includes resistive means connected between said constant-voltage generating means and said first electrical contact.

3. An auto-focusing camera according to claim 2 wherein said imaging optical system further includes a variator lens that is moved along the optical axis to vary the focal length, and said second transmission means includes means for changing the resistivity of said resistive means in response to the movement of said variator lens.

4. An auto-focusing camera according to claim 2 which further includes means for supplying current to said resistive means in response to an output signal from said response means.

5. A taking lens unit having an imaging optical system with a focusing lens movable along the optical axis and means for driving said focusing lens, said lens mount being electrically coupled to a camera body having unit for generating an information signal indicating the deviation from a predetermined focal plane of the image of the object that is formed by said imaging optical system, said electrical coupling permitting said drive means to be controlled according to said information signal, said taking lens unit comprising:

(a) terminal means including at least a first electrical contact provided for electrical coupling to said camera body;

(b) first transmission means which, in response to the movement of said focusing lens, feeds said first electrical contact with a voltage having a substantially constant and periodically repeating peak value;

(c) second transmission means which is energized to feed said first electrical contact with a voltage associated with the optical characteristics of said imaging optical system; and said camera body further including (d) response means which, in response to said periodic voltage from said first electrical contact, feeds an output signal for energizing said second transmission means between peaks of said periodic voltage.

6. A taking lens unit according to claim 5 wherein said first transmission means includes constant-voltage generating means driven intermittently responsive to the movement of said focusing lens, and said second transmission means includes resistive means connected between said constant-voltage generating means and said first electrical contact.

7. A taking lens unit according to claim 6 wherein said constant-voltage generating means includes another resistive means and current supplying means having switching means connected to said another resistive means and which is rendered conductive intermittently and supplying current to said another resistive means through said switching means, the resistive means in said first transmission means being connected between said another resistive means and said switching means.

8. A taking lens unit according to claim 6 wherein the responsive means in said camera body includes means which, in response to said output signal, supplies current to said resistive means through said first electrical contact.

9. A taking lens unit according to claim 5 wherein said second transmission means feeds said first electrical contact with a voltage indicating information on the focal length of said imaging optical system.

10. A taking lens unit according to claim 5 wherein said imaging optical system further includes a variator lens that is moved along the optical axis to vary the focal length, and said second transmission means feeds said first electrical contact with a voltage whose value changes in association with the movement of said variator lens.

11. A taking lens unit according to claim 10 wherein said second transmission means includes variable resistor means connected to said first electrical contact and responding to the movement of said variator lens.

12. An apparatus for transmitting two kinds of information between a camera body and an auxiliary unit coupled to said camera body, said apparatus comprising:

(a) coupling means including an electrical contact provided in said camera body and an electrical contact provided in said auxiliary unit and coupled to the electrical contact in said camera body;

(b) first information generating means including movable means that is displaced by manipulation;

(c) first transmission means which, responsive to the displacement of said movable means, feeds said coupling means with a voltage having a substantially constant and periodically repeating peak value;

(d) means generating an output signal between peaks of said periodic voltage responsive to said first transmission means;

(e) second information generating means having predetermined information; and (f) second transmission means which, responsive to said output signal, feeds said coupling means with a voltage indicating said predetermined information.

13. An apparatus according to claim 12 wherein said auxiliary unit is a taking lens unit and said movable means is a focusing lens provided in said taking lens unit.

* * * * *